July 17, 1973 — E. H. GIDDINGS — 3,746,521
GASIFICATION METHOD AND APPARATUS
Filed March 15, 1971 — 3 Sheets-Sheet 1

INVENTOR.
EDWARD H. GIDDINGS
BY Robert O. Webster

July 17, 1973  E. H. GIDDINGS  3,746,521

GASIFICATION METHOD AND APPARATUS

Filed March 15, 1971  3 Sheets-Sheet 3

INVENTOR.
EDWARD H. GIDDINGS
BY Robert O. Webster

United States Patent Office 3,746,521
Patented July 17, 1973

3,746,521
GASIFICATION METHOD AND APPARATUS
Edward H. Giddings, 1811 Woodrow St.,
Wichita Falls, Tex. 76301
Filed Mar. 15, 1971, Ser. No. 124,123
Int. Cl. C10j 3/16
U.S. Cl. 48—111      4 Claims

ABSTRACT OF THE DISCLOSURE

A gasification method and apparatus employing continuous concurrent unidirectional flow of gaseous and solid materials through a closed reaction chamber. The solid materials form a deep bed of moving material which is permeable to the flowing gases and within which are successive oxygenation and gasification zones. The concurrent movement of gases and solids through the deep bed provides residence times particularly suitable for gasification of nonhomogeneous solid wastes or refuse. Use of gas extraction means provides for operation of the reaction chamber at pressures less than that of the surrounding ambient atmosphere.

BACKGROUND OF THE INVENTION

Field of the invention

This invention relates to an improved method and apparatus for gasification of carbonaceous material. More particularly, this invention concerns the use of moisture and carbon content of refuse to produce a useful combustible gas therefrom.

The method and apparatus for gasification of carbonaceous material herein disclosed is applicable to any carbonaceous material such as coal, charcoal or petroleum from which producer gas is traditionally made. It is especially anticipated that the method is adapted to utilize large quantities of industrial waste or municipal refuse of low caloric value which contains a carbonaceous fraction. The present invention provides means to incinerate waste and refuse, realizing a useable commodity, a combustible gas, therefrom with a minimum of inert residue. Incidental to use of the subject method is elimination of smoke and odors commonly associated with incineration of municipal refuse.

Waste has become pollution. Environmental contamination by waste disposal must be considered as disruptive of the balance of the ecological community. It is desirable that all disposal techniques consider effect on other ecological factors. For example, disposal of refuse by incineration requires consideration of the temperature, particulate and odor contamination of the atmosphere. Refuse dumps or so called sanitary land fills upon contact with water leach out pollutants into adjacent bodies of water. Similarly, sludge or effluent of a sewage disposal plant should be recognized for its contaminating potential if not adequately treated.

The proposed Resources Recovery Act emphasizes recycling of municipal solid wastes which the President's Council on Environmental Quality calls "the clearest threat to health and the environment." All solid wastes in the United States total 4.4 billion tons annually of which residential, commercial and institutional wastes come to 250 million tons. Municipal refuse is the most difficult to handle because of the variety of materials contained. A typical content, according to the Bureau of Solid Waste Management, is 50% paper, 10% glass, 10% metal, 20% food waste, 3% yard wastes, 2% plastic, 1% cloth and rubber and 4% inert material, mostly ash. To tackle the perplexing assortment of municipal refuse requires highly flexible systems for collection, separation and incineration. Additional burdens are imposed by the necessity of meeting diverse governmental policies and requirements with respect to air, water and land pollution control.

Description of the prior art

Municipalities usually seek the cheapest means of refuse disposal which tends to be dumping and open burning. Midwest Research Institute has reported that 77.5% is dropped into open dumps. 14% is incinerated, 5% used in sanitary land fills, 3% is salvaged and 0.5% becomes compost. The varied nature of municipal refuse currently requires large, complex and inefficient installations for disposal. Improved incineration techniques are being employed in an attempt to reduce atmospheric contamination by odors and smoke. Typically, refuse is first separated according to weight or chemical composition, then dryers are employed to remove excess water and volatile constituents after which the combustible portions are burned in an incinerator in an attempt to reduce the volume and sterilize the residue with heat. Afterburners and scrubbers have been used to treat the effluent fumes from incinerators in an attempt to eliminate odors and particulate pollution of the atmosphere. Incineration temperatures of at least 1000° F. are generally believed necessary to eliminate malodorous gases.

It has been customary to add excess air to incinerators to limit flame temperatures to the range of 1400 to 1600° F. Adding large quantities of excess air creates enormous quantities of effluent gases to be handled by gas cleaning equipment that must be of great size to handle the volume of gases generated. Other incineration techniques seek to achieve high temperatures, up to 3000° F. or more, to burn-off such stubborn refuse as plastics and food wastes.

Filtration of incinerator fumes has proved impractical since the odors are generally of a complex chemical nature not possible to filter out of the odor-bearing fumes. Adsorption and catalytic agents have likewise been employed in an attempt to reduce atmospheric contamination by incinerators. Even masking agents intended as counter-odorants have been attempted with unsatisfactory results.

Methods and apparatus are known which provide for gasification of carbonaceous materials including refuse and industrial waste. Industrial gas producers are an old art employing steam and coal, charcoal or petroleum products to generate "water gas" or "producer gas." Such gas has low caloirc content and use has been generally confined to large industrial complexes. Proposed refuse gasification techniques contemplate separation, drying and grinding or other preparation prior to the actual gasification process. Also current refuse gasification techniques contemplate downward gravitational flow of the refuse fuel and contrary flow of the gaseous and vaporous products typical of traditional industrial gasification methods. Further, known gasification apparatus is operated at a pressure exceeding the ambient atmospheric pressure such that leakage of noxious fume will be outwardly into the surrounding environment.

Waste and refuse have become pollutants as a result of the materials themselves and methods employed for their reduction or elimination. The conversion of refuse into useful products by reduction or recycling may indeed alter the status of refuse from that of a pollutant to that of an economically desirable material resource. It is apparent that a single step process capable of treating large quantities of a wide variety of refuse and which results in reduction of such refuse into industrially useful commodities is to be greatly desired.

The subject invention effects joinder of the two basic fields of art, namely refuse disposal and conversion of solid carbonaceous materials into easily handled combustible gas. The method and apparatus for gasification of carbonaceous material herein disclosed in applicable to any carbonaceous material from which producer gas is traditionally made. However, it will become readily apparent that the method is adapted to handle large quantities of industrial waste or municipal refuse which contain a carbonaceous fraction.

SUMMARY OF THE INVENTION

In recognition of the need for means to reduce large volumes of refuse to economically acceptable commodities it is hereby proposed to provide an improved method and apparatus for thermal reduction of refuse to a combustible gas and nonputrescible inert solid residue.

Another object is to provide a method for gasification of materials having a carbonaceous fraction wherein there is concurrent flow of carbonaceous material and reactive gases within a reaction vessel.

Another object is to provide an improved and more efficient gasification of solid carbonaceous materials by extending time available for flowing reactive elements to react.

Another object is to provide a method for incineration of municipal refuse without prior processing such as separation, predrying or grinding.

A still further object is to provide a refuse incineration apparatus operational at pressures below that of the ambient atmosphere to eliminate leakage of gases from the apparatus into the surrounding environment.

Briefly, in accordance with the present invention, there is provided a method for using the moisture, carbon and caloric content of refuse for deriving a combustible gas therefrom. A deep moving bed of nongaseous materials provide extended zones within which oxidation and reduction processes occur. The deep bed is permeable to gases flowing unidirectionally with the bed movement so gases experience extended residence times within the zones assuring maximum opportunity for reaction between the gases and material within the moving deep bed.

An apparatus for practicing the described method comprises a substantially vertical reaction chamber containing a downwardly moving deep bed of nongaseous materials and isolating reactions occurring therein from surrounding environment. The reaction chamber is provided with means for controlled introduction of refuse and air above the moving deep bed and means for extracting gases and removal of solid residue from below the moving deep bed. A means for inducing a draft for extraction of gases is advantageous for operation of the apparatus at an internal pressure less than that of surrounding atmosphere.

Other objects and advantages of the invention will become apparent to one skilled in the art from the following detailed description of the preferred embodiments of the invention when read in connection with the accompanying drawings, in which:

DSECRIPTION OF THE PREFERRED EMBODIMENT

Figure 1:
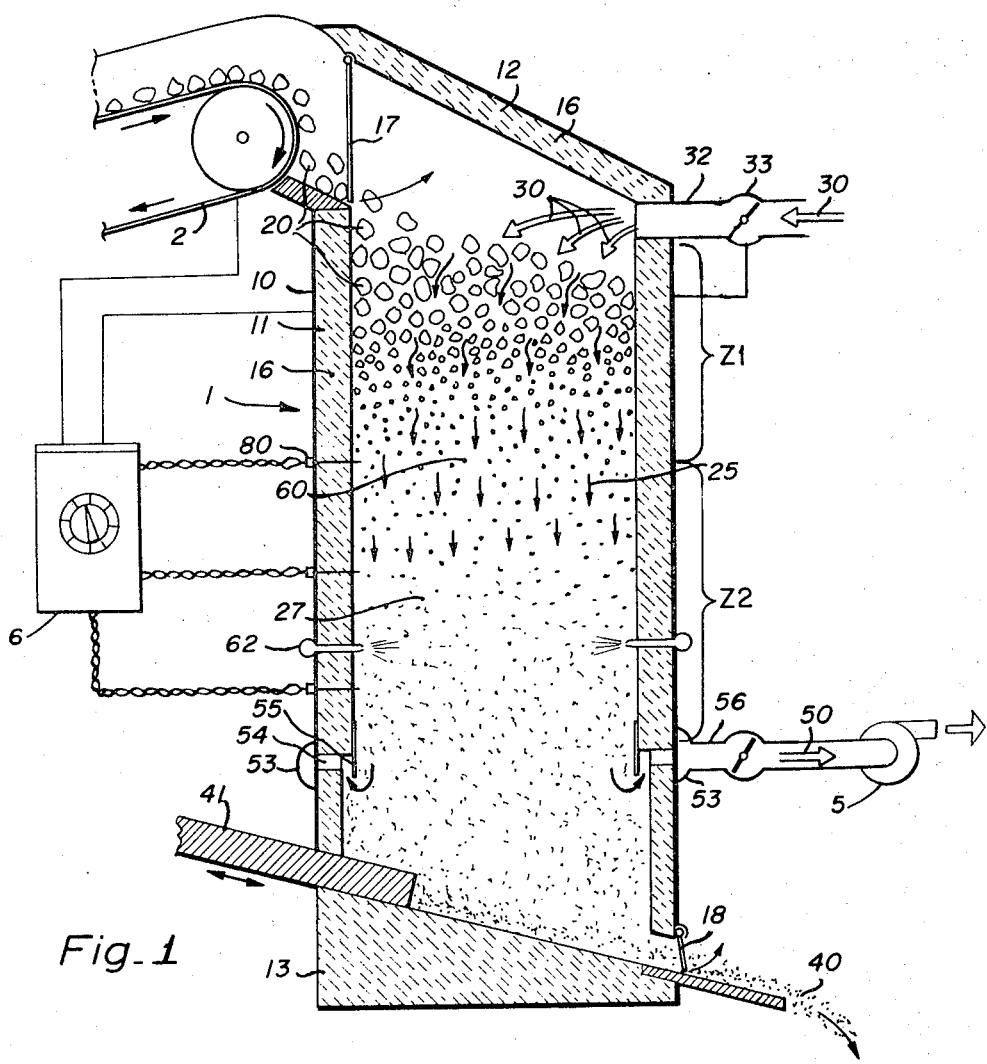
FIG. 1 is a schematical vertical cross-sectional view through a down draft refuse gasification apparatus in accordance with the present invention.

Referring now to figures in which like reference characters designate like parts, and particularly to FIG. 1 where is shown a diagrammatic illustration of a vertical sectional view of a down-draft refuse gasification apparatus 1 in accordance with the invention. A reaction chamber 10 having substantially vertical walls 11 and closed top 12 and bottom 13 effectively isolating reactions occurring within the chamber from the surrounding atmosphere. Shape of the reaction chamber 10 is not critical and plan configuration may be circular, oblong or rectangular although protuberances, recesses or corners should be avoided to prevent bridging of solid materials comprising a deep bed 60 within the chamber and to assure uniform porosity throughout the deep bed 60 for uniform downward flow of solids and gases within the chamber. Interior surfaces of the reaction chamber 10 are refractorily insulated, as generally indicated 16, to withstand internal temperatures and corrosion and to limit loss of heat outwardly.

Means is provided for delivering refuse 20 to the upper portion of the reaction chamber 10 for instance by a belt conveyor 2, as shown, or any other appropriate mode including gravity feed from above. Refuse 20 is charged into the reaction chamber while limiting uncontrolled leakage of surrounding atmosphere into the reaction chamber through, for example, a swinging door 17 as indicated. Note, however, that a door is not essential where an enclosed delivery means admits air only at a lower elevation such that hot air will not leak downwardly against atmospheric pressure. Refuse may be charged into the reaction chamber as received as no prior treatment, such as dryng, separation or grinding, is deemed necessary for proper operation of the gasification apparatus. It is conceivable however that additional charcoal or other carbonaceous material, fuel or water may be mixed with the refuse to enhance gas production. Unreacted carbon may be recovered for recycling or other use.

An oxidizing gas, for instance air, is admitted into the upper portion of the reaction chamber 10, as indicated by flow arrows 30, through an appropriate duct 32. The air may be preheated to enhance combustion or to control temperatures within the reaction chamber. Also the air may be enriched with oxygen or other reactive elements appropriate to the particular nature of refuse or fuel being charged. It is most advantageous to operate the reaction chamber 10 with an internal pressure less than that of the surrounding atmosphere obviating the possibility of leakage of noxious or toxic gases from the chamber into surrounding environment. A flow regulating device such as a valve 33, damper or other constriction may be employed to limit or vary flow of air into the reaction chamber.

A means for removal of ashes, clinkers and other solid residue is provided at the bottom 13 of the reaction chamber 10. Various techniques may be employed such as mechanically moving floors, grates or fluid removal such as water flush or pneumatic extraction. A mechanically driven ram 41 is illustrated having a reciprocating motion and sweeping the bottom 13 of the reaction chamber to forceably eject the ash 40 and other residue from the chamber. A swinging door 18 is shown intended to permit removal of the ash 40 while limiting uncontrolled leakage of surrounding atmosphere into the reaction chamber.

A gas collection manifold 53 is located externally about the lower portion of the reaction chamber 10 and ports 54 provide gas conveying communication between the interior of the reaction chamber and the collection manifold 53. Baffles 55 may be provided to assure flowing solids will not clog the gas extraction ports 54. A gas delivery duct 56 connects the gas collection manifold 53 to an appropriate pumping device, 5, for extraction of gas from the reaction chamber 10, as indicated by flow arrows 50. The combustible gases 50 extracted from the reaction chamber may be subsequently scrubbed or otherwise cleaned and compressed for delivery to the ultimate user, or may be burned for disposal or to preheat incoming air 30.

In operation addition of fresh refuse 20 to the top 12 and withdrawal of ash 40 from the bottom 13 creates and maintains a deep bed 60 of solids gravitating continuously downward within the reaction chamber 10. Air 30 is continuously admitted into the top 12 as combustible gases 50 are continuously withdrawn. The deep bed 60 of solids is maintained permeable to flow of gases at lineal flow rates substantially greater, for example about one foot per second, than linear flow rate of the solids which may have residence time of an hour or more within the deep bed 60.

Two reaction zones occur within the deep bed 60. An upper zone Z1 contains oxygen rich air resulting in progressive oxidation of the refuse 20 at it proceeds downwardly through the deep bed 60. Oxidation is an exothermal reaction, the heat generated increasing the temperatures of less reactive portions of the refuse and the gaseous products of combustion 25 within zone Z1.

The lower zone Z2 of the deep bed 60 is composed of a mixture of carbonaceous residue 27 and incandescent ash including globules of melted inert materials such as metals and glass. The gases, vaporized water or steam and products of combustion flowing from zone Z1 penetrate downwardly through zone Z2 reacting with the carbonaceous residue 27 in the well known manner of industrial gas producers. The gasification reaction within zone Z2 is endothermal removing heat from both the gases and incandescent ashes as they progress downwardly. There is thus a continuous and concurrent unidirectional flow of the refuse 20, air 30, products of combustion 25, ash 40 and combustible gases 50 within the reaction chamber 10.

Temperature and pressure sensors 80 may be located along the reaction chamber 10 and through a control device 6, regulate flow of refuse 20 and air 30 to the reaction chamber and consequently regulate rate of combustible gas 50 production. It has been determined that an initial air flow rate of about 60 cubic feet per minute is sufficient to effect continuous reduction of about 6 pounds of typical municipal refuse per minute. For example, a city like San Francisco, producing about 2000 tons of refuse per day, would require a gasification apparatus about 24 feet in diameter having a bed approximately 15 feet in depth. A differential pressure of 2 to 5 p.s.i. through the bed would be adequate to sustain requisite gas flow rates if proper permeability of the bed is maintained.

Content of the deep bed 60 of solids varies from fresh refuse 20 charged into the top to a cooled ash 40 at the bottom as a result of the progressive oxidation, pyrolysis and gasification processes occurring within the bed. The deep bed 60 of solids must remain permeable to flow of gases throughout for most efficient reactive process to occur between the gases and solids within the deep bed. If necessary permeability is maintained by agitation of the bed. Agitation may be effected by injection of air or oxygen through tuyeres 62 as shown. The injected gas reacts with the combustible gases 50 within the chamber to produce small explosions thus fractionating the bed. Mechanical stirring means similar to that employed in conventional gas producers may also be used to keep the deep bed 60 permeable to gases.

Figure 2:
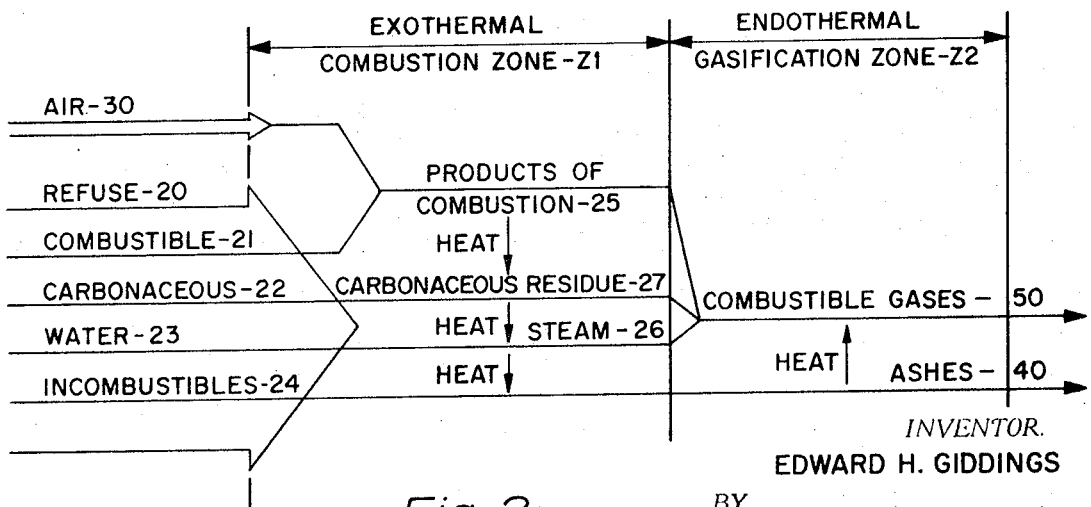
FIG. 2 is a flow diagram providing a graphic representation of the refuse gasification method in accordance with the present invention.

The flow diagram FIG. 2 is a graphic representation of the refuse gasification method in accordance with the invention. The thermo-chemical reaction between oxygen, steam and carbon in the gasification method here described does not differ from those thermo-chemical reactions well known in the gas producer art. However, the deep bed and unidirectional flow of solids and gases here employed results in residence times, thermal gradients and progressive reaction processes of particular advantage for thermal reduction and gasification of a nonhomogeneous mixture such as municipal refuse.

As indicated in the flow diagram FIG. 2, an oxidizing gas, hereinafter referred to as air 30, and refuse 20 are shown flowing concurrently into a reaction zone Z1. Major classes of constituents typical of domestic or municipal refuse are separately indicated as combustibles 21 such as volatile hydrocarbons, cellulose and organic base materials; carbonaceous materials 22 not as readily oxidized as the combustibles 21; water 23 in both free and combined forms; and incombustibles 24 including metals, glass and ash. As the refuse 20 and air 30 proceed concurrently through the combustion zone Z1 there is a progressive drying and oxidation of the more reactive combustibles. Insufficient air 30 is provided to zone Z1 to complete oxidation of all refuse constitutents therefor oxidation proceeds only until the oxygen is depleted. For instance air would be provided sufficient to burn all organic constituents but insufficient to oxidize the carbonaceous portion. Heat generated by the exothermal oxidation process is transmitted to the less reactive carbonaceous portion 22 of the refuse and products of combustion 25. The temperatures thus achieved in the lower portion of combustion zone Z1 will approximate the flame temperature of the more combustible portion 21 of the refuse, estimated to be about 3000° F. Such high temperatures are sufficient to superheat steam 26 developed from the water 23 present, remove malodorous gases and thermally crack complex organic compounds to their simpler chemical constituents, carbon and free hydrogen.

The current of gaseous products of combustion 25 and superheated steam 26 penetrate through the concurrently flowing bed of incandescent carbonaceous residue 27 and ash 40 in gasification zone Z2. In the absence of oxygen, zone Z2 constitutes a hot reducing environment in which the steam 26 and products of combustion 25 react with the carbonaceous residue 27 to produce combustible gases 50. Rate of gas production is dependent upon temperature, pressure and relative concentration of steam and carbonaceous residue. Since the gasification process is endothermal the rate of gas production will be greater upon entry into the gasification zone Z2 and will reduce as heat is depleted by the gasification process.

To most efficiently burn and gasify the wet low grade constituents comprising municipal refuse may require recycling some of the heat of combustion by preheating the incoming air 30. The preheated air 31 drys and ignites the combustible portion 21 of the incoming refuse 20 sooner in its passage through combustion zone Z1 thus raising reaction temperatures assuring more complete volatilization and pyrolysis of material passing down through the deep bed 60. Higher temperatures and longer transient time through the bed 60 assure that complex organic molecules have a greater opportunity to either crack into a few simple molecular species or oxidize. Similarly, higher temperatures and concentration of steam and carbonaceous residue in gasification zone Z2 result in a greater gasification rate.

Figure 3:
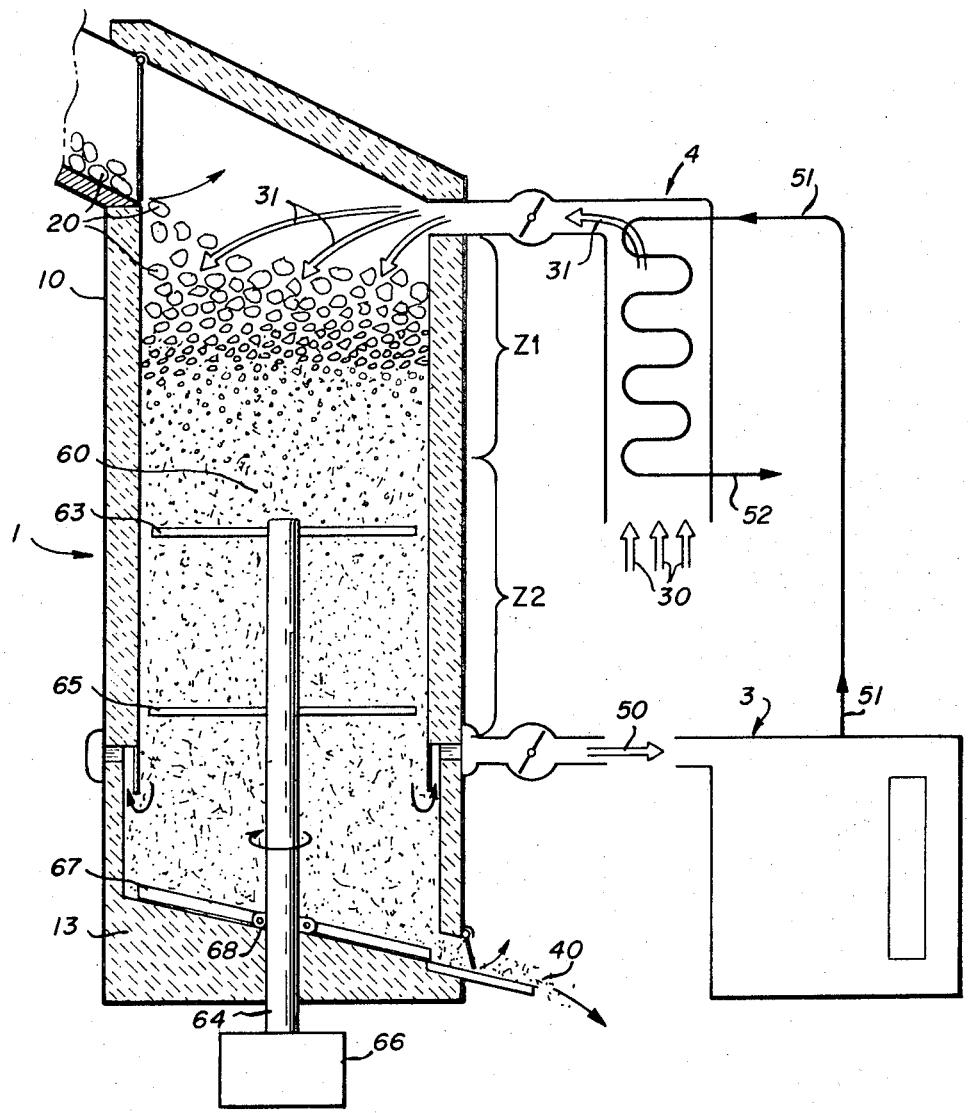
FIG. 3 is a schematical vertical cross-sectional view through a waste reducing reaction chamber with a mechanical stirrer, accessory heat exchanger and draft inducing hot gas compressor.

In FIG. 3 another ambodiment of the invention illustrates the manner in which a hot gas compressor 3, the subject of applicant's U.S. Pat. No. 3,549,278, and a heat exchanger 4 may be used to provide a most efficient refuse gasification system. A hot gas compressor 3 is shown withdrawing combustible gases 50 from the refuse gasification apparatus 1 thereby inducing the downdraft current of gases at reduced pressure within the cylindrical reaction chamber 10. Hot compressed combustible gas 51 issuing from the hot gas compressor 3 is passed through a heat exchanger 4 giving up a significant portion of its sensible heat to air 30 being supplied to the refuse gasification apparatus 1 as preheated air 31. The cooled combustible gas 52 may now be more efficiently transmitted to its consumer and the preheated air 31 more readily dries and ignites the incoming refuse 20.

A mechanical stirrer 63 is shown in FIG. 3 having a shaft 64 centrally located within the cylindrical reaction chamber 10 and blades 65 projecting radially from the shaft 64 for continuously agitating the deep bed 60 to prevent formation of clinkers and to assure permeability of the bed to gases flowing therethrough. A drive means as generally indicated at 66 is provided for imparting rotational or axial movement, or both, to the stirrer 63. Lower blades 67 of the stirrer 63 are shown hinged 68 for articulation with respect to the central shaft 64 of the stirrer permitting the lower blades 67 to sweep ashes 40 from an angular bottom 13 of the reaction chamber 10.

Figure 4:
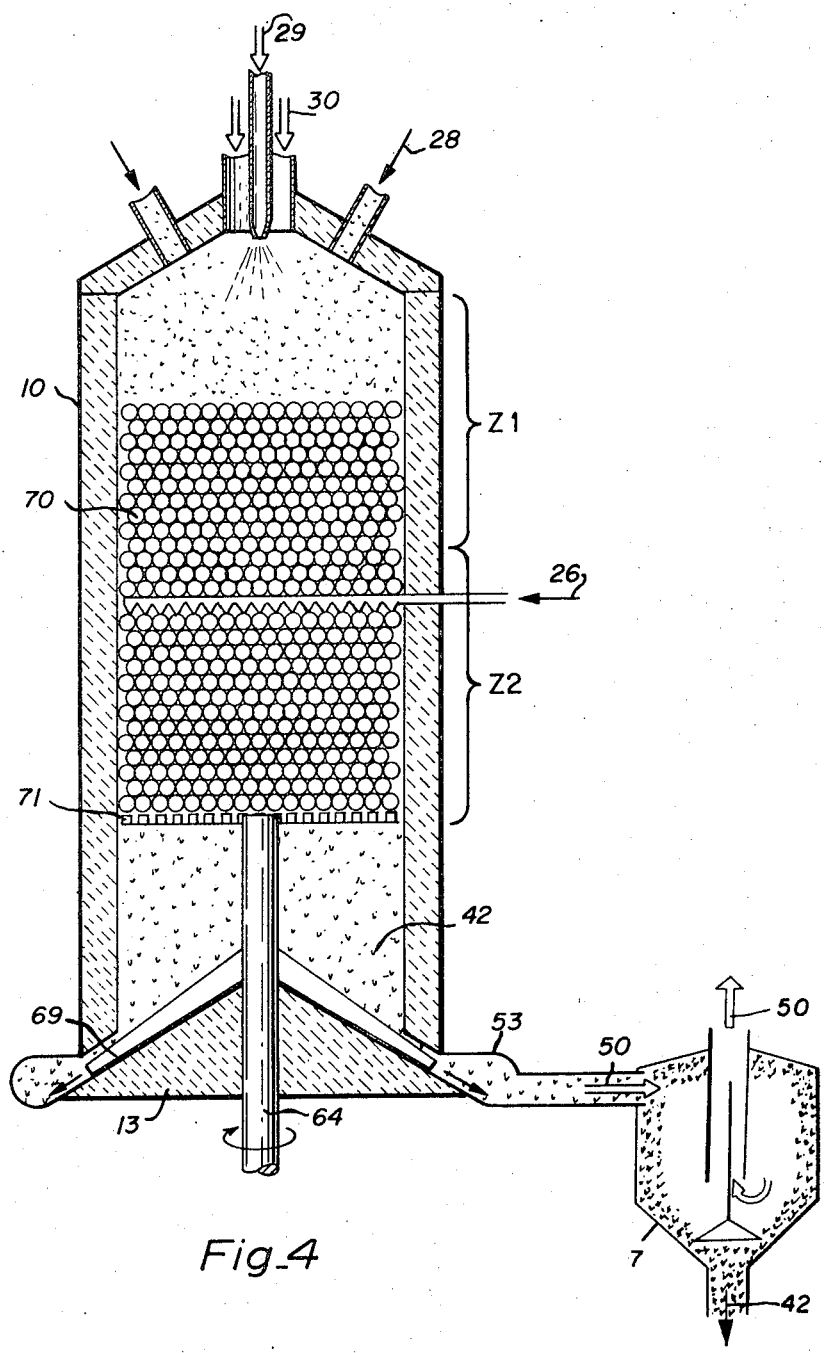
FIG. 4 is a schematical vertical cross-sectional view through a gas generator suitable for reactivation of a carbon filtration medium.

In accordance with the versatility of the gasification method of the invention, FIG. 4 illustrates a gasification apparatus suitable for disposition of sanitary wastes or sludge, or as the particular example specifically shows, use of a gasification apparatus to reconstitute carbon or charcoal which has, because of its absorptive characteristics, been used to clarify water or gas. For example, charcoal used as a filter for removing organic waste from liquid effluents may be reconstituted by passing the contaminated charcoal filter material through a gasification reaction chamber for removal of volatile organic contaminates.

Referring now to FIG. 4, a cylindrical reaction chamber 10 is provided with a deep bed of inert material 70 which though not itself flowing provides a permeable bed through which gases and particulate carbon and charcoal 42 may flow. The deep bed of inert material 70 is supported on a grate 71 through which gases and particulate matter may flow. A mechanical agitation means is represented by the rotating shaft 64 imparting a vibrating motion to the inert bed material 70 through its supporting grate 71. The agitation is desirable to assure continuous flow of solid particulate matter through the nonflowing bed of inert material 70. Angular arms 69 are shown attached to the shaft 64 for sweeping solid particulate carbon and charcoal 42 from the conical bottom 13 of the reaction chamber 10 into a collection manifold 53.

As indicated, contaminated charcoal 28, fuel 29 and air 30 are admitted into the reaction chamber 10 above the deep bed of inert material 70. Insufficient air 30 is provided to completely burn the fuel 29 although the heat generated is sufficient to volatilize the organic matter contaminating the incoming charcoal 28 while traversing combustion zone Z1 of the deep bed. Hot products of combustion, pyrolyzed organic matter and charcoal flow downwardly through the incandescent bed of gasification zone Z2 and steam 26 may be added to combine with part of the carbonaceous residue in an endothermal gasification reaction effectively reducing the sensible heat while generating a combustible gas 50.

An effluent collection manifold 53 is provided about the lower extremity of the reaction chamber 10 for pneumatic extraction of both charcoal particles 42 and combustible gases 50. Particulate charcoal 42 may be subsequently separated from the combustible gases 50 by cyclonic, centrifugal or electrostatic precipitation devices, 7, and recycled as a filtration medium. Combustible gases 50 may be used to preheat combustion air 30 admitted into the top of the reaction chamber 10.

Whereas certain forms of the invention have been shown and described, it should be understood that this description should be taken in an illustrative or diagrammatic sense only. There are many variations and modifications which will be apparent to those skilled in the art which will not depart from the scope and spirit of the invention. I, therefore, do not wish to be limited to the precise details of construction set forth, but desired to avail myself of such variations and modification as come within the scope of the appended claims.

What is claimed is:

1. An apparatus for producing combustible gases from particulate carbonaceous material, fuel, steam and air, comprising:

a reaction chamber having substantially vertical walls and enclosed top and bottom, the interior surfaces thereof having an insulating refractory capable of withstanding temperatures and corrosion associated with reactions occurring therein;

a deep bed of material inert to reactions occurring within said reaction chamber and supported on a grate within said reaction chamber, and said deep bed having an upper combustion zone and a lower gasification zone and being permeable to passage of particulate material and gases therethrough;

means for agitating said inert bed to induce passage of particulate material therethrough;

means for charging said particulate carbonaceous material into said chamber above said inert bed;

means for charging fuel into said chamber above said inert bed;

means for supplying air into said chamber above said inert bed;

means for introducing steam into said gasification zone of said inert bed; and means for extracting combustible gases and solid residue from said reaction chamber.

2. The apparatus in accordance with claim 1 wherein said extraction means includes a separator for removal of solid residue from combustible gases.

3. The method for producing combustible gases comprising:

continuous concurrent unidirectional flow of fuel, water, air and particulate carbonaceous filtration material contaminated with organic material, through successive combustion and gasification reactions within an essentially stationary deep bed of material inert to said reactions and permeable to said flow therethrough, combustion of said fuel and air generating heat which causes organic contaminates to volatilize and pyrolyze, carbonaceous material to become incandescent combining with said water in said gasification reaction thereby producing combustible gases and removing contaminating organic material and reconstituting said carbonaceous filtration material.

4. The method for producing combustible gases from municipal refuse comprising:

controlled addition of refuse, water and air above a downwardly moving deep bed of said refuse within an enclosed chamber maintained at a pressure less than that of surrounding atmosphere, said refuse comprising a nonhomogeneous mixture of combustibles, carbonaceous material and an incombustible fraction, said air limited in amount to that sufficient to oxidize said combustibles;

continuous downward passage of said refuse, water and air through said deep bed maintaining therein substantially stationary zones within which occur successive combustion and gasification reactions, heat from said combustion causing carbonaceous material to become incandescent, combining with said water to produce combustible gases;

rate of addition of said refuse controlled in accordance with temperature and pressure measured within said chamber and responsive to reactions occurring within said chamber;

agitation of said deep bed to assure permeability thereof to passage of gases therethrough; and continuous extraction of combustible gases and solid residue from said deep bed and chamber.

(References on following page)

References Cited

UNITED STATES PATENTS

| | | | |
|---|---|---|---|
| Re. 15,320 | 3/1922 | McDonald | 48—209 |
| 1,505,065 | 8/1924 | West et al. | 48—206 X |
| 1,838,622 | 12/1931 | Herrick | 201—25 X |
| 2,204,902 | 6/1940 | McDonald | 48—203 |
| 2,805,188 | 9/1957 | Josenhans | 48—203 X |
| 2,126,150 | 8/1938 | Stryker. | |
| 3,549,278 | 12/1970 | Giddings | 417—349 |
| 2,662,005 | 12/1953 | Evans | 48—212 X |
| 1,536,696 | 5/1925 | Wallace. | |
| 3,511,194 | 5/1970 | Stookey | 110—8 R |

FOREIGN PATENTS

| | | | |
|---|---|---|---|
| 688,064 | 2/1953 | Great Britain | 252—416 |

JOSEPH SCOVRONEK, Primary Examiner

U.S. Cl. X.R.

48—63, 206, 209; 110—8 R, 31; 252—416